(12) United States Patent
Kawazoe et al.

(10) Patent No.: US 6,865,481 B2
(45) Date of Patent: Mar. 8, 2005

(54) NAVIGATION APPARATUS AND INTERACTIVE INFORMATION PROVIDING PROGRAM

(75) Inventors: Yoshihiro Kawazoe, Tsurugashima (JP); Takehiko Shioda, Tsurugashima (JP); Toshio Tabata, Tsurugashima (JP); Shinichi Gayama, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/438,661

(22) Filed: May 14, 2003

(65) Prior Publication Data

US 2003/0216862 A1 Nov. 20, 2003

(30) Foreign Application Priority Data

May 15, 2002 (JP) .................................... P2002-140582

(51) Int. Cl.⁷ .............................................. G01C 21/34
(52) U.S. Cl. ...................................... 701/211; 701/200
(58) Field of Search .................................. 701/211, 200, 701/202, 209, 201; 340/995.19, 990

(56) References Cited

U.S. PATENT DOCUMENTS

| | | | | |
|---|---|---|---|---|
| 6,526,335 B1 | * | 2/2003 | Treyz et al. | 701/1 |
| 6,598,018 B1 | * | 7/2003 | Junqua | 704/251 |

* cited by examiner

*Primary Examiner*—Marthe Y. Marc-Coleman
(74) *Attorney, Agent, or Firm*—Ladas & Parry LLP

(57) ABSTRACT

A navigation apparatus, which is to be mounted on a movable body, comprises a navigation information acquisition unit, a requirement judgment unit and a control unit. The navigation information acquisition unit acquires navigation information relating to movement of the movable body. The requirement judgment unit judges as whether or not dialog start requirements are satisfied on the basis of the navigation information. The control unit gives a speech to a user to start providing interactive information, in case where the dialog start requirements are satisfied.

11 Claims, 5 Drawing Sheets

<INTERACTIVE SCENARIO INFORMATION>

FIG. 5(a)

```
DIALOG EXAMPLE 1   N: NAVIGATION   U: USER

N: Where are you going?
U: I will go out.
N: Will be the route guided?
U: Yes.
N: Input the destination.
U: Tokyo Disneyland.
N: The guidance will be started.
```

FIG. 5(b)

```
DIALOG EXAMPLE 1   N: NAVIGATION   U: USER

N: Where are you going?
U: Tokyo Disneyland.
N: Will be the route guided?
U: No.
N: Processing will be terminated.
```

NAVIGATION APPARATUS AND INTERACTIVE INFORMATION PROVIDING PROGRAM

BACKGROUND OF THE INVENTION

1. Field of the Invention

The present invention relates generally to a navigation apparatus, which permits to provide interactive information to a user.

2. Description of the Related Art

The recent navigation apparatus has functions not only of merely displaying map information, but also of serving as an information terminal device for providing a user with many kinds of information such as route guidance information to destination and traffic information in the vicinity of the current position. A standard navigation apparatus is provided with a remote controller, a voice input device, or an input device such as a touch-sensitive panel so that many kinds of information required by the user through such an input device is displayed on a monitor, or outputted in the form of voice message, thus providing the user with the information.

The above-described navigation apparatus actively provides the user with information relating to a driving route to destination and traffic information on the route as guided, during the route guidance to the destination, which has been set by the user. However, in case where the specific functions of the navigation apparatus is not utilized since the user is familiar with information on the route along which the user is driving, resulting in no need to perform the route guidance, for example, the navigation apparatus merely displays the map of the current position and its vicinity. In this case, it cannot be said that the functions of the information terminal device is sufficiently performed.

In addition, the navigation apparatus does not in principle give a speech to a user or put a query to him/her, unless the user request information through the input unit. Nevertheless, there are developed certain recent navigation apparatus, which put a query of "Where are you going?" when powering on the system, or output voice message of "Will you take a break now?" after a continuous driving for about 2 hours. There are however limited conditions at which the navigation apparatus gives a speech or puts the query in this manner, and there is also limitation in contents and kinds of speech and inquiry.

SUMMARY OF THE INVENTION

An object of the present invention, which was made in view of the above-mentioned problems, is therefore to provide a navigation apparatus, which permits to actively provide interactive information as an occasion demands, thus providing an effective utilization of the functions of the navigation apparatus.

In order to attain the aforementioned object, the navigation apparatus of the first aspect of the present invention, which is to be mounted on a movable body, comprises:

a navigation information acquisition unit for acquiring navigation information relating to movement of said movable body;

a requirement judgment unit for judging as whether or not dialog start requirements are satisfied on a basis of said navigation information; and a control unit for giving a speech to a user to start providing interactive information, in case where said dialog start requirements are satisfied.

The above-mentioned navigation apparatus is mounted on the movable body such as a vehicle so as to provide a user with map information and information relating to the movement of the movable body. The navigation information relating to the movement of the movable body is acquired along with the movement thereof. The, there is judged, on the basis of the navigation information, as whether or not the dialog start requirements, i.e., the requirements for starting providing the interactive information are satisfied. In case where the dialog start requirements are satisfied, the navigation apparatus gives a speech to a user. The providing of the interactive information is started through the speck. Accordingly, when the predetermined requirements are satisfied during the driving of the movable body on which the navigation apparatus is mounted, the navigation apparatus actively gives the speech to the user and then, the user makes a response to it, thus advancing the interactive information providing. It is therefore possible to provide the user with the necessary information and comfortable driving conditions.

In an embodiment of the above-mentioned navigation apparatus, it may comprise a user-specific information acquisition unit for acquiring user-specific information relating to a usage record of said movable body as used by the user so that said requirement judgment unit judges as whether or not the dialog start requirements are satisfied on a basis of at least one of said navigation information and said user-specific information. According to such an embodiment, there is acquired the user-specific information relating to the usage record of the movable body, such as the past driving record of the user. It is then judged as whether or not the dialog start requirements, i.e., the requirements for starting providing the interactive information are satisfied.

In another embodiment of the above-mentioned navigation apparatus, said navigation information may include information, which is indicative whether or not a route guidance to a destination is being performed, and said dialog start requirements may include, as one of requirements, a requirement that said route guidance has not as yet been performed. Accordingly, the requirement that the route guidance has not as yet been performed is set as the dialog start requirements, thus making it possible to provide information through conversational interaction with the user, without causing hindrance of the guidance of route.

In further another embodiment of the above-mentioned navigation apparatus, said navigation information may include information, which is indicative whether or not a route guidance to a destination is being performed, and said dialog start requirements may include an essential requirement that said route guidance has not as yet been performed. This makes it possible to prevent surely the speech from being given during the route guidance, to hinder it.

In still further another embodiment of the above-mentioned navigation apparatus, said control unit may have a storage section for storing a plurality of interactive scenario information, each of said plurality of interactive scenario information including said dialog start requirements and interactive scenario data, said control unit causing a dialog with the user to progress on a basis of said dialog scenario data. Accordingly, the interactive scenario information is prepared on the assumption of many conditions during the movement of the movable body, thus making it possible to provide an appropriate interactive information in various conditions.

In still further another embodiment of the above-mentioned navigation apparatus, said interactive scenario data may be composed of state transition data in which a state transits in accordance with input by the user, and said control unit may execute information output in each of the states to cause the state to transit in accordance with the input by the user, which corresponds to said information output. Accordingly, execution of the state transition processing based on the interactive scenario data to provide the predetermined information output suffices, thus making it possible to provide the interactive information through repetition of a simple processing.

In still further another embodiment of the above-mentioned navigation apparatus, said control unit may execute said information output through output of synthesized voice, and subject spoken voice of the user to a voice recognition processing so as to acquire the input by the user. It is therefore possible for the user to take conversational interaction through the voice output from the navigation apparatus and the voice input by the user's own utterance, without causing any problems in the driving operation, even when the user is driving the movable body.

In the preferred embodiment, said dialog start requirements may include a requirement relating to at least one of a current position of said movable body, kilometrage traveled thereof, driving time thereof, current time, a driving record and a state of equipment as mounted on said movable body.

In still further another embodiment of the above-mentioned navigation apparatus, it may comprises an updating unit for updating said user-specific information on a basis of information acquired through the input by the user during the providing of the interactive information. According to such an embodiment, information as newly acquired during the interactive information providing can be registered in the user-specific information. Consequently, necessary information can automatically be acquired as the user-specific information, during the conversational interaction, with the result that there is no need to carry out an operation to set specifically the user-specific information.

In another aspect of the present invention, an interactive information providing program to be executed by a computer is to be mounted on a movable body, wherein said program causes said computer to function as:

a navigation information acquisition unit for acquiring navigation information relating to movement of said movable body;

a requirement judgment unit for judging as whether or not dialog start requirements are satisfied on a basis of said navigation information; and a control unit for giving a speech to a user to start providing interactive information, in case where said dialog start requirements are satisfied.

Executing the above-mentioned program by means of the computer, which is disposed in the navigation apparatus, enables the interactive information according to the present invention to be provided in the many kinds of navigation apparatus.

BRIEF DESCRIPTION OF THE DRAWINGS

FIGS. 5(a) and 5(b) are views showing examples on the basis of which a dialog is held according to the interactive scenario date as shown in FIG. 4.

DETAILED DESCRIPTION OF THE PREFERRED EMBODIMENTS

Now, a preferred embodiment of the present invention will be described in detail below with reference to the accompanying drawings.

[Structure of Navigation Apparatus]

Figure 1:
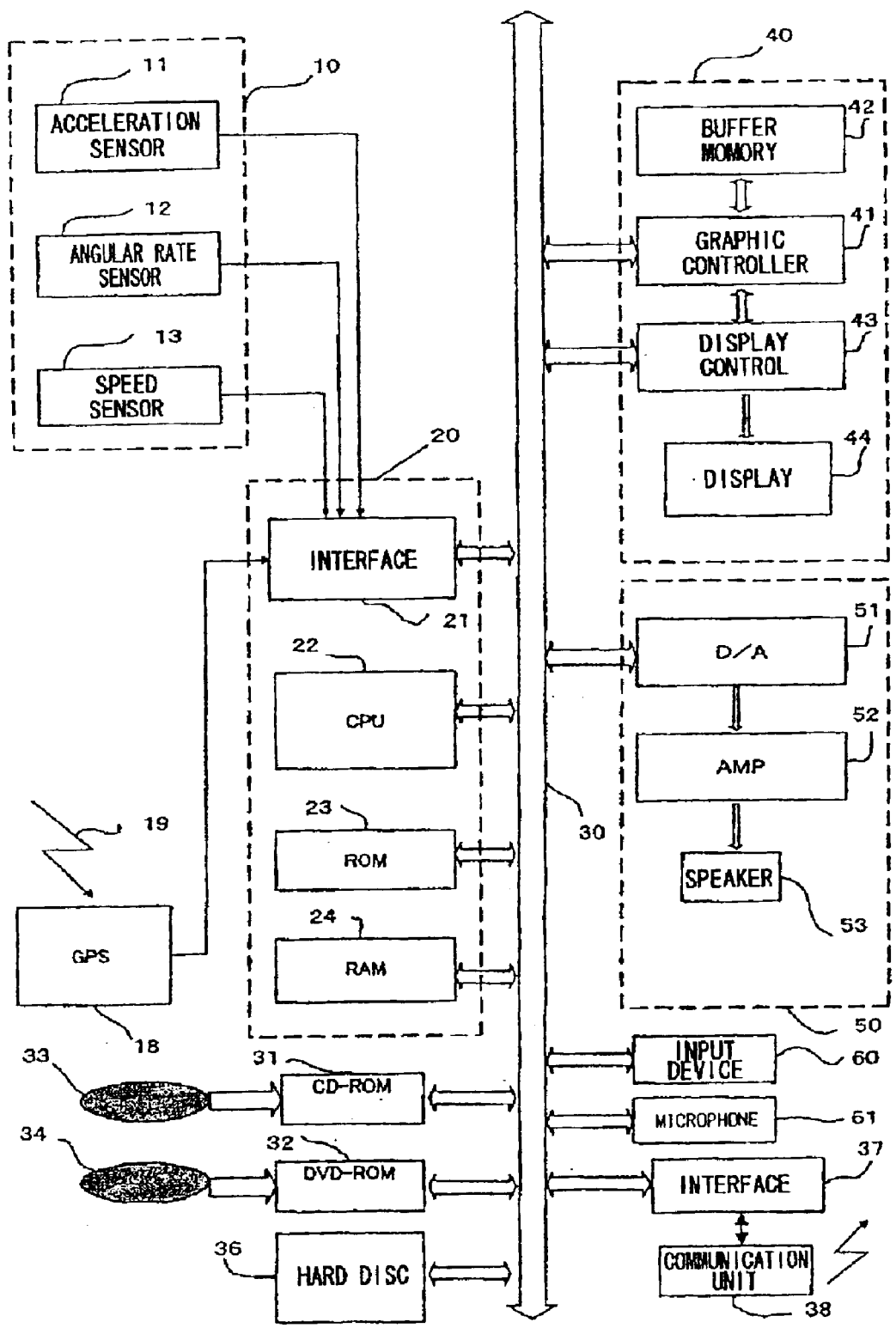
FIG. 1 is a block diagram illustrating a structure of the navigation apparatus to which the present invention is applied.

The navigation apparatus to which the present invention is applied will be described with reference to FIG. 1. FIG. 1 is a block diagram illustrating a structure of the navigation apparatus of the present invention.

The navigation apparatus includes a self-positioning unit 10, a GPS receiver 18, a system controller 20, a CD-ROM drive 31, a DVD-ROM drive 32, a hard disc unit 36, a communication interface 37, a communication device 38, a display unit 40, a voice output unit 50, an input unit 60 and a microphone 61, as shown in FIG. 1.

The self-positioning unit 10 includes an acceleration sensor 11, an angular rate sensor 12 and a speed sensor 13. The acceleration sensor 11, which is composed of for example a piezoelectric element, detects acceleration of a vehicle and outputs the acceleration data. The angular rate sensor 12, which is composed of for example an oscillation gyroscope, detects angular rate of the vehicle when changing the direction of the vehicle and outputs angular rate data and relative direction data.

The speed sensor 13 is composed of a vehicle velocity sensor, which mechanically, electromagnetically or optically detects the number of rotations of an axle of the vehicle and generates velocity pulse in the form of pulse signal every rotation of the axle by a predetermined angle.

The GPS receiver 18 is an element for receiving a radio wave through which downlink data including positioning data from a plurality of GPS satellites that are utilized to detect the absolute position of the vehicle based on latitude and longitudinal information.

The system controller 20 includes an interface 21, a CPU (Central Processing Unit) 22, a ROM (Read Only Memory) 23 and a RAM (Random Access Memory) 24, so as to make an entire control of the navigation apparatus.

The interface 21 interfaces with the acceleration sensor 11, the angular rate sensor 12 and the speed sensor 13, as well as the GPS receiver 18. The interface 21 inputs data such as the acceleration data, the relative direction data, the angular rate data, the GPS positioning data and the absolute positional data, in addition to the vehicle velocity pulse, to the system controller 20. The CPU 22 makes an entire control of the system controller 20. The ROM 23 includes a not-shown nonvolatile memory in which a control program for controlling the system controller 20 is stored. The RAM 24 stores many data such as route data, which has been previously set by a user through an input unit 60 so that the data can be read out, and provides a working area relative to the CPU 22.

The system controller 20, the CD-ROM drive 31, the DVD-ROM drive 32, the hard disc unit 36, the communication interface 37, the display unit 40, the voice-output unit 50, the input unit 60 and the microphone 61 are connected to each other through bus lines 30.

The CD-ROM drive 31 and the DVD-ROM drive 32 read data such as road data including the number of lanes and the road width, as well as control programs, which correspond to the embodiments described later, from a CD 33 and a DVD 34, respectively, and output signals. Only one of the CD-ROM drive 31 and the DVD-ROM drive 32 may be provided, or a CD/DVD compatible drive may be provided.

The DVD-ROM drive 32 may have a function of reproducing a visual DVD on which video data such as a movie has been recorded. The video data as reproduced from the visual DVD is displayed through the display unit 40 so that the user can watch the visual contents such as the movie. In this case, the user can perform a switching operation between the map data for navigation and the video data from the visual DVD to display data as required on the display unit 40.

The hard disc unit 36 stores audio data and video data, which are read out through the CD-ROM drive 31 or the DVD-ROM drive 32, as well as data for navigation, which include the map data. This makes it possible to read the audio data and the video data as stored in the hard disc unit 36 and output signals, while reading the map data stored on the CD-ROM 33 or the DVD-ROM 34 to perform the navigation operation. This also makes it possible to read the map data stored in the hard disc unit 36 and output signals, while reading the audio data and the video data stored on the CD-ROM 33 or the DVD-ROM to output signals. Further, this makes it possible to store the audio data and the video data, or the map data, which are downloaded through the communication device 38, and read such data to output signals, as an occasion demands.

The communication device 38, which is composed for example in the form of cellular mobile telephone, is configured so that all or part of the audio data, the video data or the map data, or a certain kind of database associating with them can be downloaded through the communication interface 37, which constitutes a modem. In case where the communication device 38 is composed in the form of cellular mobile telephone, it is possible to access a predetermined website to acquire required information. The communication device 38 may be composed in the form of receiver, which is compatible with for example a VICS (Vehicle Information Communication System), thus acquiring traffic information or traffic-jam information.

The display unit 40 displays many kinds of display data under the control of the system controller 20. The display unit 40 includes a graphic controller 41, a buffer memory 42, a display control section 43 and a display 44. The graphic controller 41 makes an entire control of the display unit 40 on the basis of the control data supplied from the CPU 22 through the bus line 30. The buffer memory 42, which is composed for example in the form of memory such as VRAM (Video RAM), temporarily stores the video information, which can be displayed instantly. The display control section 43 makes a control of the display 44 such as liquid crystal or CRT (Cathode Ray Tube) on the basis of the video data as outputted from the graphic controller 41. The display 44, which is composed for example in the form of liquid crystal display device having the diagonal length of about from 5 to 10 inches, is disposed on or in the vicinity of a front panel of the vehicle. The display unit 40 may display television pictures, which are received through a not-shown antenna, or video data of a visual DVD, which is reproduced, utilizing the DVD-ROM drive 32, in addition to display of the map data for navigation.

A further additional display unit for video, which has the same structure as described above, may be provided for exclusive use of reproduction of the visual DVD. This makes it possible to reproduce many contents (for example, an electronic book or an electronic novel) from the DVD or the other recording medium to display data on the video display unit. In addition, connection to the Internet through the communication device 38 makes it possible to scour the Internet web sites through the video display unit.

The voice-output unit 50 includes a D/A converter 51, an amplifier (AMP) 52 and a loudspeaker 53. The D/A converter 51 makes, under the control of the system controller 20, a digital-analog conversion of voice digital data, which are sent through the bus line 30 from the CD-ROM drive 31 or the DVD-ROM 32, or the RAM 24. The amplifier 52 amplifies a voice analog signal outputted from the D/A converter 51. The loudspeaker 53 converts the amplified voice analog signal into voice to output the voice in the vehicle room.

The input unit 60 is composed of keys, switches, buttons, a remote controller and a voice input section, through which many commands or data can be inputted. The input unit 60 is disposed in the vicinity of the front panel of the main body of the navigation apparatus or the display 44, which are placed in the vehicle room.

The microphone 61 collects utterance of the user in the vehicle room. The thus obtained voice signals are subjected to the voice recognition processing and the recognition results are sent to the system controller 20. The conversational interaction between the navigation apparatus and the user can be performed in this manner.

It is needless to say that the navigation apparatus may be provided with many structural components, which constitute a known car audio system or a car television system, which includes a radio antenna, a radio tuner, a television antenna, a television tuner, a cassette deck or an MD drive.

[Interactive Information Providing]

Figure 2:
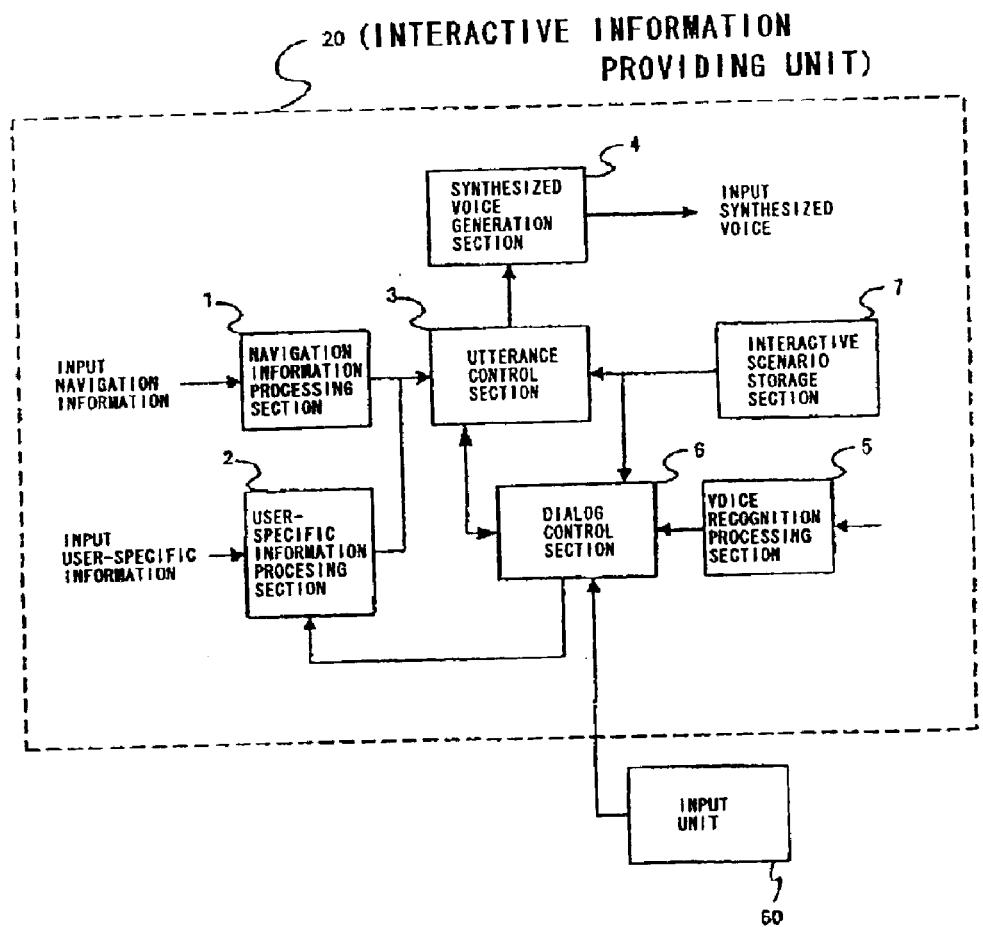
FIG. 2 is a block diagram illustrating a functional structure of an interactive information providing unit according to the present invention.

Now, the interactive information providing, which is an element bearing a central role of the present invention, will be described below. In the present invention, operating the above-described system controller 20 as the interactive information providing unit provides the user with the interactive information from the navigation apparatus. FIG. 2 shows a block diagram illustrating the function of the interactive information providing unit. The interactive information providing unit is achieved by executing the previously prepared program by means of the CPU 22 in the system controller 20.

As shown in FIG. 2, the interactive information providing unit includes a navigation information processing section 1, a user-specific information processing section 2, an utterance control section 3, a synthesized voice generation section 4, a voice recognition processing section 5, a dialog control section 6 and a interactive scenario storage section 7.

The navigation information processing section 1 acquires, generates and stores the navigation information obtained by the navigation apparatus. The navigation information includes information such as a current position of the vehicle, a current time, kilometrage traveled from start of driving to the current time, a driving time from start of driving to the current time, a driving record and as whether the driving route has been set (i.e., the route is now being guided). The navigation information is updated along with the driving of the vehicle on which the navigation apparatus is mounted, as an occasion demands.

The user-specific information processing section 2 acquires, generates and stores user-specific information. The user-specific information includes certain information such as a past driving record of the user, an address of the user, an address of the user's work place and ports of call. The user-specific information is also updated along with the driving of the vehicle, as an occasion demands.

The utterance control section 3 makes a control of utterance through the navigation apparatus, on the basis of the navigation information and/or the user-specific information, which are supplied from the navigation information processing section 1 and the user-specific information processing section 2. Interactive information providing modes are previously prepared in the form of interactive scenarios in the interactive information providing unit. The interactive scenario storage section 7 has previously stored these interactive scenarios. The interactive scenario includes dialog start requirements for starting a dialog from the side of the navigation apparatus. The utterance control section 3 judges as whether or not the dialog start requirements in any one of the interactive scenarios are satisfied, on the basis of the navigation information and/or the user-specific information as acquired from the navigation information processing section 1 and/or the user-specific information processing section 2. In case where it is judged that the dialog start requirements are satisfied, the utterance control section 3 generates utterance information in correspondence to the interactive scenario at this stage and sends it to the synthesized voice generating section 4. The voice information is information, which is to be outputted in the form of voice. The dialog control section 6 simultaneously acquires the interactive scenario from the interactive scenario storage section 7. Detail description of them will be given later.

The synthesized voice generation section 4 generates synthesized voice on the basis of the voice information supplied from the utterance control section 3 and sends it to the voice output unit 50. The voice output unit 50 outputs a message through the synthesized voice from the loudspeaker 53. Utterance is given from the navigation apparatus in this manner. The utterance control section 3 may also supply the utterance information to the display unit 40 so as to display the utterance information on the display 44 in the form of character data.

User's voice input through the microphone 61 causes the input data to be supplied to the voice recognition processing section 5. The voice recognition processing section 5 executes the voice recognition processing so as to send the recognition results of the voice input by the user to the utterance control section 6. The user may conduct an instruction operation or an input operation with the use of the remote controller or the input unit 60 such as a touch-sensitive panel. In this case, the input signals from the input unit 60 are also supplied to the utterance control section 6.

The utterance control section 6 set the interactive scenario on the basis of the interactive scenario information, which has been acquired from the interactive scenario storage section 7. The dialog control section 6 progresses conversational interaction between the navigation apparatus and the user. More specifically, the dialog control section 6 receives the recognition results of the voice input from the voice recognition processing section 5 and gives a necessary utterance through the synthesized voice generation section 4 in accordance with the interactive scenario. When new user-specific information is obtained during the conversational interaction with the user, the thus obtained information is then sent to the user-specific information processing section 2 to update the user-specific information.

In the interactive information providing unit, the utterance control section 3 first judges as whether or not the dialog start requirements in any one of the interactive scenarios as previously prepared are satisfied. In case where the dialog start requirements are satisfied, the dialog control section 6 advances the conversational interaction between the navigation apparatus and the user in accordance with the corresponding interactive scenario.

Figure 3:
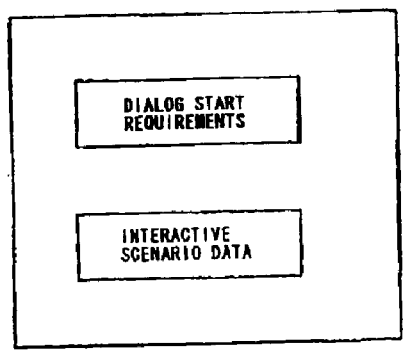
FIG. 3 is a view showing a structural example of interactive scenario information.

Now, the interactive scenario information will be described below. FIG. 3 shows a schematic structure of the interactive scenario. As shown in FIG. 3, the interactive scenario includes the dialog start requirements and interactive scenario data. The dialog start requirements are indicative of requirements for executing the conversational interaction in accordance with the corresponding interactive scenario. The utterance control section 3 receives the navigation information and the user-specific information, which are supplied from the navigation information processing section 1 and the user-specific information processing section 2. In case where there are satisfied the dialog start requirements, which are includes in any one of the interactive scenario information in a plurality of scenario information stored in the interactive scenario storage section 7, the utterance control section 3 executes the corresponding interactive scenario.

In an example case, the dialog start requirements in a single interactive scenario (hereinafter referred to as "Example No. 1 of the interactive scenario") may be set as follows.

EXAMPLE NO. 1 OF INTERACTIVE SCENARIO

*Contents: Recommendation of the Route Guidance is Made.
*Dialog Start Requirements:
  Requirement 1: The route has not as yet been set.
  Requirement 2: The current position has not been recorded in the driving record.
  Requirement 3: Any route to the current position has not as yet been recorded in the driving record and the kilometrage traveled reaches a predetermined distance, or the driving time reaches a predetermined time.

Figure 4:
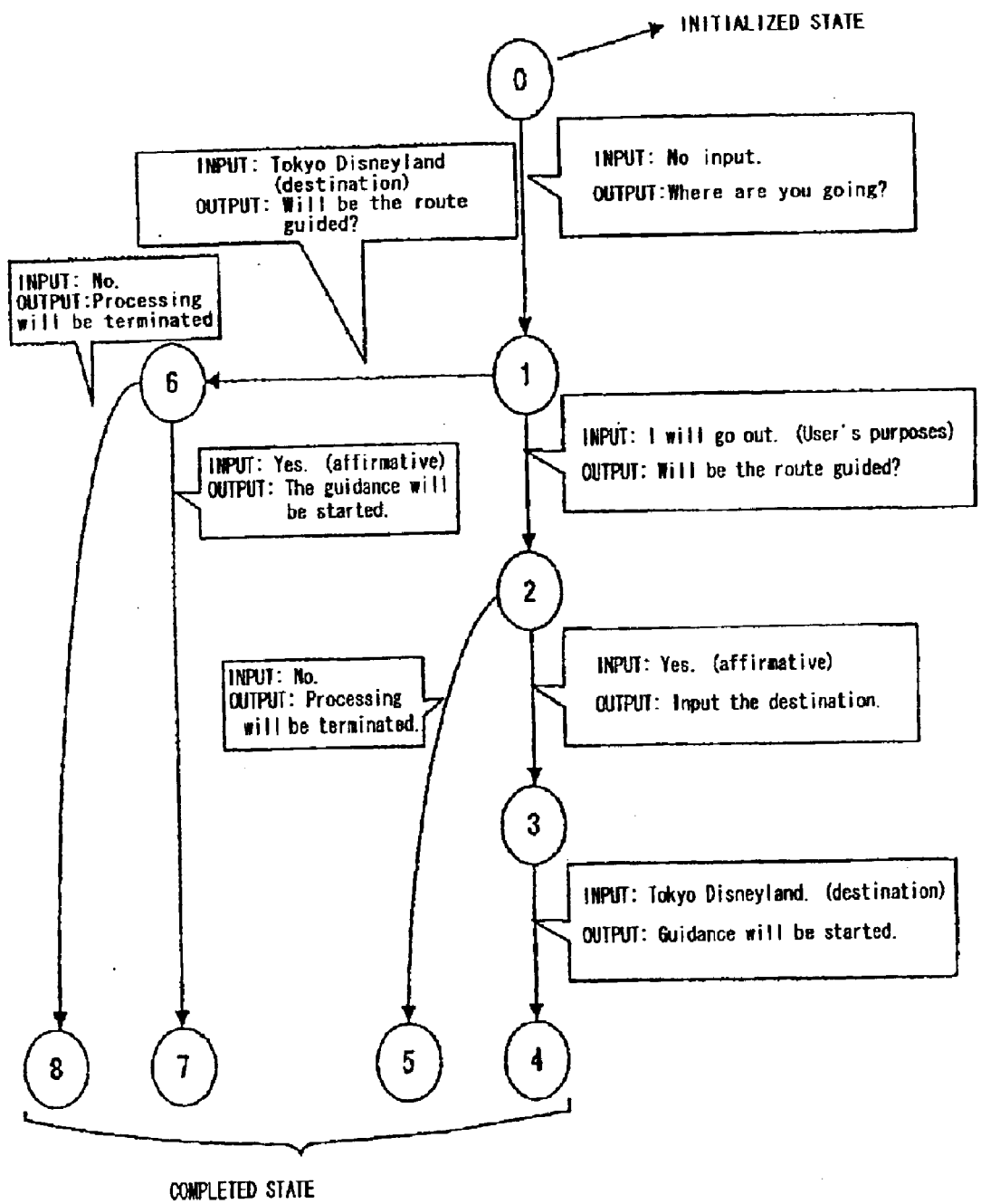
FIG. 4 is a state transition view showing an example of interactive scenario data.

The interactive scenario data may be composed for example through a finite-state automaton as shown in FIG. 4. FIG. 4 shows the interactive scenario data for the above-mentioned Example No. 1 of interactive scenario. More specifically, when the dialog start requirements in Example No. 1 of the interactive scenario are satisfied, the dialog control section 6 executes the conversational interaction in accordance with the interactive scenario data as shown in FIG. 4.

Example No. 1 of interactive scenario is an interactive scenario in which the navigation apparatus recommends the user applying the route guidance. More specifically, the situation in which the route has not as yet been set during the driving of the vehicle of the user (Requirement 1) and the current position has not as yet been recorded in the driving record (Requirement 2), means that the user is driving to destination where the user has never been, without applying the route guidance. It is assumed from the kilometrage traveled or driving time exceeding the predetermined value (Requirement 3) that the current position is distant from the destination by a certain distance. In such a case, the navigation apparatus starts executing the conversational interaction in accordance with the interactive scenario data as shown in FIG. 4. More specifically, the navigation apparatus asks, "Where are you going?" and then causes the state to transit to the next state on the automaton in accordance with a reply by the user to the question. The state transition progresses in accordance with the interactive scenario data, and then reaches to the final stage (Stage 4, 5, 7 or 8), resulting in termination of the conversational interaction.

In the interactive scenario data as shown in FIG. 4, in case where there is the state transition of "Stage 0→Stage 1→Stage 2→Stage 3→Stage 4", the conversational interaction between the navigation apparatus and the user is shown in FIG. 5(a). Alternatively, in the interactive scenario data as shown in FIG. 4, in case where there is the state transition of "Stage 0→Stage 1→Stage 6→Stage 8", the conversational interaction between the navigation apparatus and the user is shown in FIG. 5(b). In FIGS. 5(a) and 5(b), "N" denotes utterance contents of the navigation apparatus and "U" denotes utterance contents of the user.

Another example of the interactive scenario will be described below.

EXAMPLE NO. 2 OF INTERACTIVE SCENARIO

*Contents: The User is Asked About Destination and Recommendation of the Route Guidance is Made.
*Dialog Start Requirements:
  Requirement 1: The route has not as yet been set.
  Requirement 2: The current position has already been recorded in the driving record.
  Requirement 3: A route to the current position has already been recorded in the driving record and the kilometrage traveled reaches a predetermined distance, or the driving time reaches a predetermined time.
  Requirement 4: The destination has been specified into a small number of destinations or a single destination.
*Utterance Example of the Navigation Apparatus: "Are you going to . . . (Destination)?"

In this example, although the route has not as yet been set, the user is driving on the route along which he/she has previously taken a drive, and the destination can be specified from the driving record. Accordingly, the navigation apparatus addresses the user to ask him/her about the destination. The destination may be set and the route guidance may be started, if there is a user's desire to do so.

EXAMPLE NO. 3 OF INTERACTIVE SCENARIO

*Contents: The User is Alerted to Have a Break and then Given the Guidance of a Rest Stop.
*Dialog Start Requirements:
  Requirement 1: The current position is on an expressway.
  Requirement 2: The user is driving on the expressway by a predetermined distance or for a predetermined period of time to reach the current position.
*Utterance Example of the Navigation Apparatus: "Will You Take a Break Now? Will Any Rest Stop be Guided?"

In this example, the user is driving on the expressway by the predetermined distance or for the predetermined period of time. It is considered from this fact that the user is tired. In this case, the user is alerted to have a break. The route guidance to the nearest rest stop may be made, if there is a user's desire to do so.

EXAMPLE NO. 4 OF INTERACTIVE SCENARIO

*Contents: The Conversational Interaction is Taken.
*Dialog Start Requirements:
  Requirement 1: Today is a workday.
  Requirement 2: It is business time of the day (for example from 7 AM to 9 AM).
  Requirement 3: The car is moving (the power of the navigation apparatus is turned ON).
  Requirement 4: The user seldom drives the car on the workday in accordance with the user-specific information.
*Utterance Example of the Navigation Apparatus: "Are You Off Today?"

In this example, the user drives the car in daylight on the workday in which the user seldom drives the car. In this case, a question in topics is asked in everyday situations.

EXAMPLE NO. 5 OF INTERACTIVE SCENARIO

*Contents: The Conversational Interaction is Taken.
*Dialog Start Requirements:
  Requirement 1: Today is a workday.
  Requirement 2: It is business time of the day (for example from 7 AM to 9 AM).
  Requirement 3: The car is moving (the power of the navigation apparatus is turned ON).
  Requirement 4: The user is driving in a region removed from the past driving record during hours in a state where Requirements 1 and 2 are satisfied.
*Utterance Example of the Navigation Apparatus: "Are You Off Today?"

In this example, the user drives the car in the region removed from that in which the user commutes. In this case, a question in topics is asked in everyday situations.

EXAMPLE NO. 6 OF INTERACTIVE SCENARIO

*Contents: The User is Informed of Kilometrage Traveled.
*Dialog Start Requirements:
  Requirement 1: Kilometrage traveled on current day reaches an even value such as 100 km, 200 km or the like.
*Utterance Example of the Navigation Apparatus: "Kilometrage Traveled on the Current Day Just Reaches 100 km."

In this example, the user is informed of the kilometrage traveled on the basis of kilometrage information.

EXAMPLE NO. 7 OF INTERACTIVE SCENARIO

*Contents: The User is Informed of Kilometrage Traveled.
*Dialog Start Requirements:
  Requirement 1: Accumulated kilometrage traveled after installation of the navigation apparatus reaches an even value such as 500 km, 1000 km or the like.
*Utterance Example of the Navigation Apparatus: "Accumulated Kilometrage Traveled on the Current Day Just Reaches 500 km."

In this example, the user is informed of the accumulated kilometrage traveled on the basis of kilometrage information.

EXAMPLE NO. 8 OF INTERACTIVE SCENARIO

*Contents: The User is Informed of Movement Between Prefectural and City Governments.
*Dialog Start Requirements:
  Requirement 1: The car has passed the border between the prefectures, at the current position.
*Utterance Example of the Navigation Apparatus: "You Have Driven into . . . Prefecture, . . . city."

In this example, the user is informed that he/she has driven into another prefecture.

EXAMPLE NO. 9 OF INTERACTIVE SCENARIO

*Contents: The User is Informed of Variation of Weather.
*Dialog Start Requirements:
  Requirement 1: The weather forecast, which is periodically acquired through the communication device, is varied.

*Utterance Example of the Navigation Apparatus: "According to the Weather Forecast, it will Rain."

In this example, the user is informed of variation of weather, thus enabling him/her to brace for wet weather, as an occasion demands. The weather forecast can be acquired through the communication device 38 from information providers on the website. It is possible to acquire periodically (for example, every hour) the weather forecast to inform the user of the situation when variation of weather is forecast. Informing the user of variation of weather, and especially, worsening weather (such as thunderstorm, snowfall and approach of typhoon) enables the user to drive safely and make preparation for the variation of weather.

EXAMPLE NO. 10 OF INTERACTIVE SCENARIO

*Contents: The User is Recommended Reproducing Music.
*Dialog Start Requirements:
   Requirement 1: Audio equipment has not been operated for a predetermined period of time.
*Utterance Example of the Navigation Apparatus: "Shall I Put on the Radio?"

In this example, the user is recommended utilizing the audio equipment so as to provide an environment in which the user can drive comfortably.

In the present invention, when the dialog start requirements in the interactive scenario as previously prepared are satisfied, the conversational interaction between the navigation apparatus and the user is advanced in accordance with the corresponding scenario in the manner as described above. Especially, preparation of the interactive scenario through which the user is recommended utilizing the navigation apparatus or the audio equipment, provide an effective utilization of these apparatus. In addition, providing information relating to the driving or additional information such as weather forecast, or giving utterance in everyday situations ensures the user's safe and comfortable driving.

Figure 6:
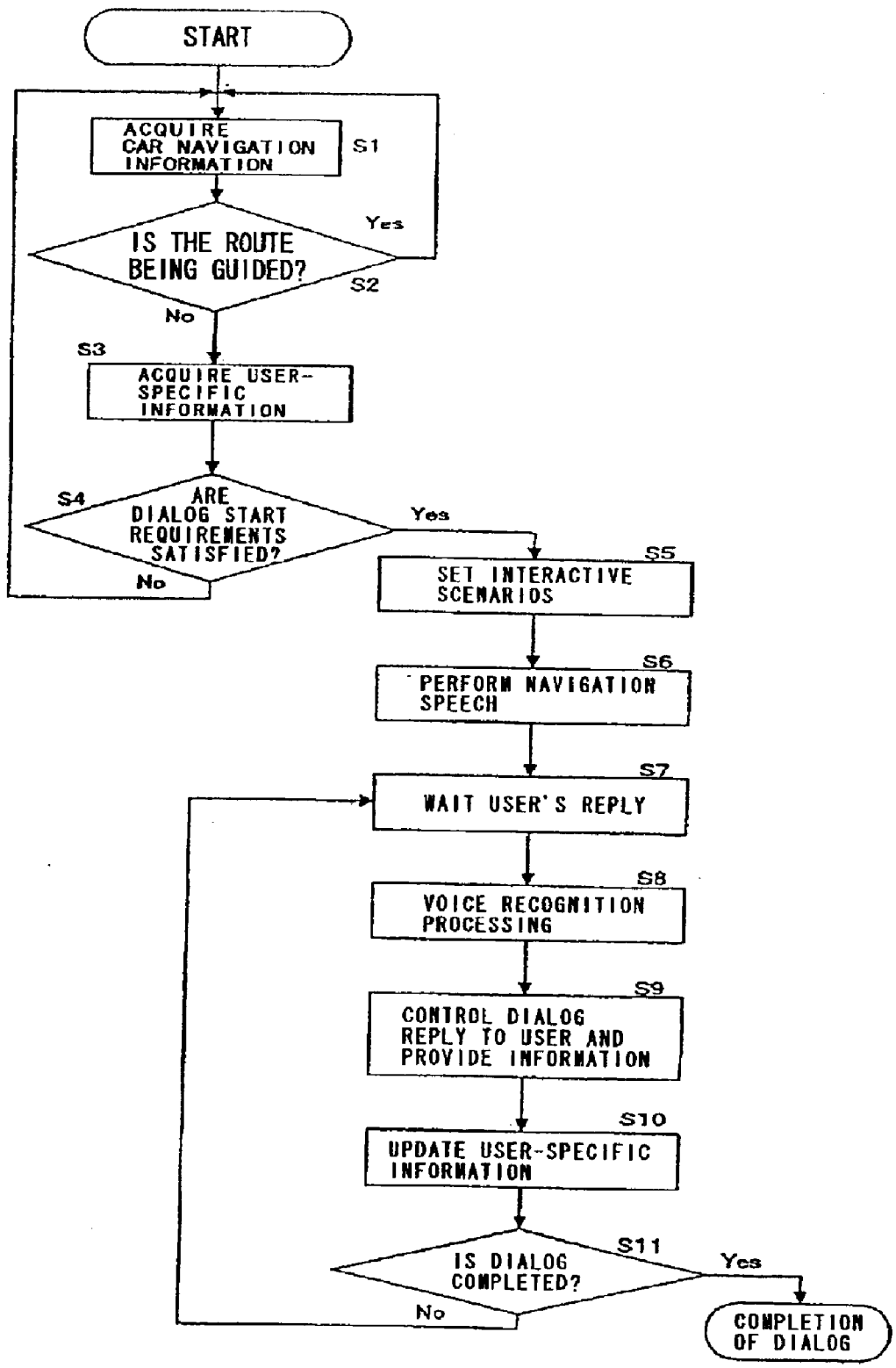
FIG. 6 is a flowchart illustrating an example of the interactive information providing processing.

Now, flow of the interactive information providing processing will be described in detail with reference to FIG. 6. FIG. 6 is a flowchart of the interactive information providing processing. The interactive information providing processing is executed by means of the interactive information providing unit (see FIG. 2), which is embodied by causing the CPU 22 in the system controller to execute the predetermined program. The interactive information processing as shown in FIG. 6 is a processing corresponding to Example No. 1 of interactive scenario.

First, the navigation information processing section 1 acquires the navigation information from the respective structural components of the navigation apparatus as shown in FIG. 1 (Step S1) and judges, on the basis of the thus acquired information, as whether or not the utterance control section 3 is now carrying out the route guidance (Step S2). The above-mentioned judgment can be made by checking as whether or not the traveling route has been set in the navigation apparatus. In case where the route is being guided, the dialog start requirements are not satisfied (i.e., Requirement 1 is not satisfied), leading to no utterance of the utterance control section 3.

Alternatively, in case where the route is not being guided, the user-specific information processing section 2 acquires the user-specific information (Step S3). The utterance control section 3 judges, on the basis of the user-specific information, as whether or not the other dialog start requirements (i.e., Requirements 2 and 3) are satisfied. In case where they are not satisfied, the processing turns to Step 1. Alternatively, in case where the dialog start requirements are satisfied, the utterance control section 6 acquires the interactive scenario data (see FIG. 3) from the interactive scenario storage section 7 so as to set a state in which the conversational interaction can be progressed (Step S5).

Then, the utterance control section 3 gives the first utterance (Step S6) so that the dialog control section 6 waits for a response from the user (Step S7). When the response from the user is obtained in the form of voice input, the voice recognition processing section 5 carries out the voice recognition processing to send the recognition results to the dialog control unit 6 (Step S8). The dialog control section 6 gives a further utterance to the user or provides him/her of necessary information in the form of synthesized voice input or character display, in accordance with the interactive scenario data (Step S9).

Further, the dialog control section 6 sends the user-specific information, which is obtained along with the progress of the interactive scenario, to the user-specific information processing section 2 so that the user-specific information processing section 2 updates the user-specific information (Step 10). The dialog control section 6 judges as whether or not the conversational interaction has been completed in accordance with the interactive scenario, and namely, the conversational interaction reaches the final transition state of the interactive scenario data as exemplified in FIG. 4 (Step S11). In case where the conversational interaction has not as yet been completed, the dialog control section 6 further advances the conversational interaction in accordance with the interactive scenario (Steps S7 to S11). Alternatively, the completion of the conversational interaction leads to termination of the processing.

[Modification]

The above-described Example Nos. 1 to 10 of interactive scenario in which many requirements are set as the dialog start requirements, are classified into a group in which the requirement of the route guidance being active or inactive (namely, the route setting has been completed or not) is included as the dialog start requirement and the other group in which such a requirement is not included as the dialog start requirement. However, the dialog start requirements for the respective interactive scenario may be set under the essential requirement of the route guidance being active or inactive. In a usual case, the navigation apparatus provides the output of the voice message at checkpoints on the driving route during execution of the route guidance, with the result that there may be no need to execute the further additional conversational interaction. Giving the utterance having no relation to the route guidance may lead to a state in which it is difficult to recognize the difference between the above-mentioned utterance and the utterance for the route guidance, thus causing problems on the route guidance for original purpose. It is therefore possible to avoid the above-mentioned inconvenience by setting the requirement of the route guidance being inactive, as the essential dialog start requirement so that the above-described interactive information can be provided only in case where the route guidance is inactive.

In addition, it is useful to prepare an interactive scenario to recommend the user applying the route guidance at a certain opportunity, in case where the route guidance has not been performed. Many situations in which the user continues his/her driving by a predetermined distance or for a predetermined period of time, or drives in a region removed from the past driving record, without applying the route guidance, may be set as the dialog start requirements, so as to advance the interactive scenario having the contents of recommending the user applying the route guidance.

Configuring the program, which performs the respective functions of the interactive information providing unit of the present invention, independent of the navigation apparatus so that the program can be introduced into the navigation apparatus through a recording medium or a communication device, enables the interactive information providing of the present invention to be embodied in many kind of navigation apparatus provided with the structural component corresponding to the system controller 20.

According to the present invention as described in detail, the navigation apparatus gives utterance to a user so as to advance the conversational interaction, thus enabling the conversational interaction with the user to be started from the side of the navigation apparatus. In addition, the route guidance and many kind of information can be provided in accordance with the contents of the interactive scenario as prepared, thus providing an effective utilization of the functions of the navigation apparatus, which originally serves as the information terminal device. Utterance given by the navigation apparatus brings about effects of providing the user with a refreshing change of pace and keeping him/her awake.

The entire disclosure of Japanese Patent Application No. 2002-140582 filed on May 15, 2002 including the specification, claims, drawings and summary is incorporated herein by reference in its entirety.

What is claimed is:

1. A navigation apparatus, which is to be mounted on a movable body, comprising:
   a navigation information acquisition unit for acquiring navigation information relating to movement of said movable body;
   a requirement judgment unit for judging as whether or not dialog start requirements are satisfied on a basis of said navigation information; and
   a control unit for giving a speech to a user to start providing interactive information, in case where said dialog start requirements are satisfied.

2. The apparatus as claimed in claim 1, further comprising:
   a user-specific information acquisition unit for acquiring user-specific information relating to a usage record of said movable body as used by the user so that said requirement judgment unit judges as whether or not the dialog start requirements are satisfied on a basis of at least one of said navigation information and said user-specific information.

3. The apparatus as claimed in claim 1, wherein:
   said navigation information includes information, which is indicative whether or not a route guidance to a destination is being performed, and said dialog start requirements includes, as one of requirements, a requirement that said route guidance has not as yet been performed.

4. The apparatus as claimed in claim 1, wherein:
   said navigation information includes information, which is indicative whether or not a route guidance to a destination is being performed, and said dialog start requirements includes an essential requirement that said route guidance has not as yet been performed.

5. The apparatus as claimed in claim 1, wherein:
   said control unit has a storage section for storing a plurality of interactive scenario information, each of said plurality of interactive scenario information including said dialog start requirements and interactive scenario data, said control unit causing a dialog with the user to progress on a basis of said dialog scenario data.

6. The apparatus as claimed in claim 5, wherein:
   said interactive scenario data are composed of state transition data in which a state transits in accordance with input by the user, and
   said control unit executes information output in each of the states to cause the state to transit in accordance with the input by the user, which corresponds to said information output.

7. The apparatus as claimed in claim 6, wherein:
   said control unit executes said information output through output of synthesized voice, and subjects spoken voice of the user to a voice recognition processing so as to acquire the input by the user.

8. The apparatus as claimed in claim 1, wherein:
   said dialog start requirements include a requirement relating to at least one of a current position of said movable body, kilometrage traveled thereof, driving time thereof, current time, a driving record and a state of equipment as mounted on said movable body.

9. The apparatus as claimed in claim 1, further comprising:
   an updating unit for updating said user-specific information on a basis of information acquired through the input by the user during the providing of the interactive information.

10. An interactive information providing program to be executed by a computer, which is to be mounted on a movable body, wherein said program causes said computer to function as:
    a navigation information acquisition unit for acquiring navigation information relating to movement of said movable body;
    a requirement judgment unit for judging as whether or not dialog start requirements are satisfied on a basis of said navigation information; and
    a control unit for giving a speech to a user to start providing interactive information, in case where said dialog start requirements are satisfied.

11. The program as claimed in claim 10, wherein:
    said program causes said computer to function as a user-specific information acquisition unit for acquiring user-specific information relating to a usage record of said movable body as used by the user so that said requirement judgement unit judges as whether or not the dialog start requirements are satisfied on a basis of at least one of said navigation information and said user-specific information.

* * * * *